(12) United States Patent
Hasegawa et al.

(10) Patent No.: US 11,193,901 B2
(45) Date of Patent: Dec. 7, 2021

(54) THERMAL CONDUCTIVITY MEASURING DEVICE, THERMAL CONDUCTIVITY MEASURING METHOD AND VACUUM EVALUATION DEVICE

(71) Applicant: EKO INSTRUMENTS CO., LTD., Tokyo (JP)

(72) Inventors: Toshikazu Hasegawa, Tokyo (JP); Yukihiro Goto, Tokyo (JP); Isamu Chiba, Tokyo (JP)

(73) Assignee: EKO INSTRUMENTS CO., LTD., Tokyo (JP)

( * ) Notice: Subject to any disclaimer, the term of this patent is extended or adjusted under 35 U.S.C. 154(b) by 212 days.

(21) Appl. No.: 16/464,296

(22) PCT Filed: Nov. 29, 2016

(86) PCT No.: PCT/JP2016/085315
§ 371 (c)(1),
(2) Date: May 28, 2019

(87) PCT Pub. No.: WO2018/100608
PCT Pub. Date: Jun. 7, 2018

(65) Prior Publication Data
US 2019/0360953 A1   Nov. 28, 2019

(51) Int. Cl.
*G01N 25/18* (2006.01)
*G01K 7/02* (2021.01)
(Continued)

(52) U.S. Cl.
CPC .................... *G01N 25/18* (2013.01)

(58) Field of Classification Search
USPC ............................ 374/44, 179, 166, 100, 107
See application file for complete search history.

(56) References Cited

U.S. PATENT DOCUMENTS

| 6,676,287 B1 | 1/2004 | Mathis et al. |
| 2002/0136261 A1 | 9/2002 | Naka et al. |
| 2019/0162682 A1* | 5/2019 | Daw ................... G01N 27/002 |

FOREIGN PATENT DOCUMENTS

| CN | 1351256 A | 5/2002 |
| JP | 2013-88258 A | 5/2013 |
| JP | 2017-026385 A | 2/2017 |

OTHER PUBLICATIONS

WIPO, International Search Report for PCT/JP2016/085315, dated Feb. 21, 2017.
(Continued)

*Primary Examiner* — Mirellys Jagan

(57) ABSTRACT

The object of the invention is to provide a thermal conductivity measuring device that comprises a heat generator arranged in such a way as to come into contact with an object to be measured for thermal conductivity, a heat resistant material arranged in such a way as to come into contact with the heat generator, at least one pair of differential thermocouples for measuring a voltage value caused by the difference in temperature of two points of the heat resistant material, the temperature being generated by allowing heat to flow from the heat generator, and a calculating device for calculating the time rate of change of output voltage of the differential thermocouples and then calculating the thermal conductivity of the object to be measured on the basis of the calculated time rate of change.

12 Claims, 7 Drawing Sheets

(51) Int. Cl.
G01K 7/00 (2006.01)
G01K 3/04 (2006.01)

(56) References Cited

OTHER PUBLICATIONS

WIPO, written opinion for PCT/JP2016/085315, dated Feb. 21, 2017.
The State Intellectual Property Office of People's Republic of China, Office Action for Chinese Patent Application No. 201680091087.5, dated Apr. 9, 2021.
Nie Guanghua et al., Measurement of Thermal Conductivity of Several Crystal Hydrate Salts, Journal of Northwest University (Natural Science Edition), vol. 31, No. 6, Dec. 2001 (Cited in Chinese Office Action for Chinese Patent Application No. 201680091087.5).

* cited by examiner

| Sample | Thermal conductivity [W/mK] | Inclination of output |
|---|---|---|
| Air | 0.0241 | 0.2464 |
| Vespel | 0.3711 | 0.0612 |
| Pyrex | 1.087 | 0.0365 |
| Isotropic carbon | 126 | 0.0039 |

THERMAL CONDUCTIVITY MEASURING DEVICE, THERMAL CONDUCTIVITY MEASURING METHOD AND VACUUM EVALUATION DEVICE

FIELD OF THE INVENTION

The present invention relates to a thermal conductivity measuring device, a thermal conductivity measuring method and a vacuum evaluation device.

BACKGROUND OF THE INVENTION

A vacuum insulation panel (VIP) has been used more and more not only in refrigerators but housing construction materials as well, because its thermal insulation efficiency is so high that energy saving effects can be achieved. The vacuum insulation panel declines in its performance due to a decrease in the degree of vacuum caused by leakage or the like; since it is difficult to confirm the decline visually, it is essential to measure thermal conductivity. Methods for measuring the thermal conductivity of a specimen include those described in Patent Documents 1 and 2 (U.S. Pat. No. 6,676,287 and Japanese Patent Application Kokai Publication No. 2013-88258).

SUMMARY OF THE INVENTION

In the methods described in Patent Documents 1 and 2, however, it is difficult to measure thermal conductivity accurately in a short period of time. In other words, although it is desirable to use the output of a thermocouple at a time when the temperature change of an object to be measured reaches a certain steady state in order to accurately measure the thermal conductivity, it generally takes time for the temperature rise to reach a steady state, and a long period of time is required particularly for vacuum insulation panels having low thermal conductivity.

Therefore, one object of the present invention is to measure accurate thermal conductivity in a short period of time. Also, one object of the present invention is to evaluate the degree of vacuum with high efficiency in a short period of time.

The thermal conductivity measuring device according to the present invention comprises a heat generator arranged in such a way as to come into contact with an object to be measured for thermal conductivity, a heat resistant material arranged in such a way as to come into contact with the heat generator, at least one pair of differential thermocouples for measuring a voltage value caused by the difference in temperature of two points of the heat resistant material, the temperature being generated by allowing heat to flow from the heat generator, and a calculating device for calculating the time rate of change of output voltage of the differential thermocouples and then calculating the thermal conductivity of the object to be measured on the basis of the calculated time rate of change.

Furthermore, the abovementioned calculating device may calculate the thermal conductivity of the object to be measured using the equation (1) shown below:

$$Y=aX^{-b} \quad (1)$$

(wherein, in the equation (1), X is the thermal conductivity of the object to be measured, Y is the time rate of change of the object to be measured, and a and b are constants).

Furthermore, the constants a and b in the abovementioned equation (1) may be values found by applying, to the equation (1), results obtained by making measurements using two or more kinds of materials whose thermal conductivity is known.

Furthermore, the calculating device may calculate the thermal conductivity of the object to be measured by making measurements in advance using two or more kinds of materials whose thermal conductivity is known and then using a linear equation found on the basis of the relationship between the thermal conductivity of each material and the time rate of change of output voltage of the differential thermocouples at the time of making a measurement for each material.

Furthermore, the device may comprise two or more of the differential thermocouples, wherein each differential thermocouple may measure a voltage value caused by the difference in temperature of two different points, the each differential thermocouple being connected to each other in a series, wherein the calculating device may calculate the time rate of change of outputs of a plurality of differential thermocouples connected to each other in a series and then calculate the thermal conductivity of the object to be measured on the basis of the calculated time rate of change.

Furthermore, on the surface where the heat generator comes into contact with the object to be measured, a buffer material for absorbing the uneven shape of the object to be measured may be provided.

Furthermore, the device may comprise a mechanism of measuring the difference in temperature that occurs inside the thermal resistant material due to the flow of heat from the heat generator in the traversal direction, wherein the calculating device may correct the thermal conductivity of the object to be measured using the difference in temperature in the traverse direction thus measured.

In the method for measuring thermal conductivity according to the present invention: a control unit generates heat from a heat generator arranged in such a way as to come into contact with an object to be measured for thermal conductivity as well as with a heat resistant material; a calculating device obtains a voltage value caused by the difference in temperature of two points of the heat resistant material, which is measured by a differential thermocouple; the calculating device calculates the time rate of change of the output volume of the differential thermocouple; and the calculating device calculates the thermal conductivity of the object to be measured on the basis of the time rate of change thus calculated.

Furthermore, the abovementioned calculating device may calculate the thermal conductivity of the object to be measured using the equation (1) shown below:

$$Y=aX^{-b} \quad (1)$$

(wherein, in the equation (1), X is the thermal conductivity of the object to be measured, Y is the time rate of change of the object to be measured, and a and b are constants).

Furthermore, the constants a and b in the abovementioned equation (1) may be values found by applying, to the equation (1), results obtained by making measurements using two or more kinds of materials whose thermal conductivity is known.

Furthermore, the calculating device may calculate the thermal conductivity of the object to be measured by making measurements in advance using two or more kinds of materials whose thermal conductivity is known and then using a linear equation found on the basis of the relationship between the thermal conductivity of each material and the time rate of change of output voltage of the differential thermocouples at the time of making a measurement for each material.

The vacuum evaluation device according to the present invention comprises: a heat generator arranged in such a way as to come into contact with an object to be measured for the degree of vacuum; a heat resistant material arranged in such a way as to come into contact with the heat generator; at least one pair of differential thermocouples for measuring a voltage value caused by the difference in temperature of two points of the heat resistant material, the temperature being generated by allowing heat to flow from the heat generator; a calculating device for calculating the time rate of change of output voltage of the differential thermocouples and then calculating the thermal conductivity of the object to be measured on the basis of the calculated time rate of change; and a vacuum evaluation section for evaluating the degree of vacuum of the object to be measured on the basis of the thermal conductivity thus calculated.

(Effect of the Invention) The present invention allows for measuring accurate thermal conductivity in a short period of time. Also, the present invention allows for evaluating the degree of vacuum with high efficiency in a short period of time.

DETAILED DESCRIPTION OF THE INVENTION

Next, the following describes the aspect for implementing the present invention in detail with reference to drawings.

Figure 1:
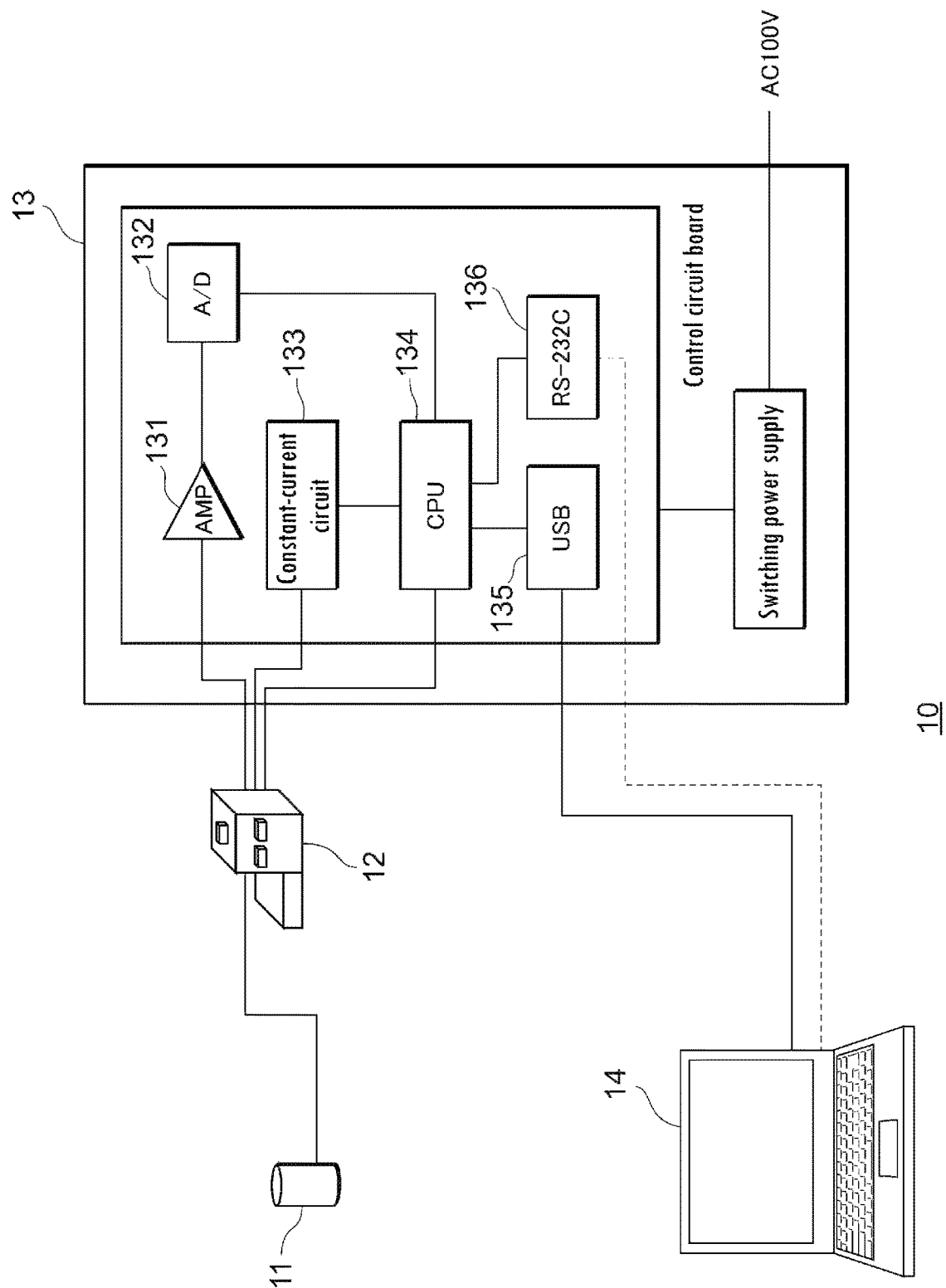
FIG. 1 is a view showing the configuration of a thermal conductivity measuring device according to one embodiment of the present invention.

(Aspect of Implementation) FIG. 1 is a view showing the configuration of a thermal conductivity measuring device 10 according to one embodiment of the present invention. As shown in FIG. 1, the thermal conductivity measuring device 10 comprises a measuring section 11, a display device 12, a control device 13, and a computer (a calculating device, a vacuum evaluating section) 14. The measuring section 11, the display device 12, the control device 13, and the computer 14 are connected to each other via telecommunication lines. The thermal conductivity measuring device 10 may comprise a barcode reader, a QR code® reader or the like as needed so that a barcode provided on an object to be measured can be read and the object to be measured can automatically be identified.

The thermal conductivity measuring device 10 is a device for measuring the thermal conductivity of an object to be measured 30 such as a vacuum insulation material. The thermal conductivity measuring device 10 calculates the thermal conductivity of the object to be measured 30 by processing, at the control unit 13, measurement data obtained at the measuring section 11 using a thermocouple and then analyzing it using the computer 14.

Figure 2:
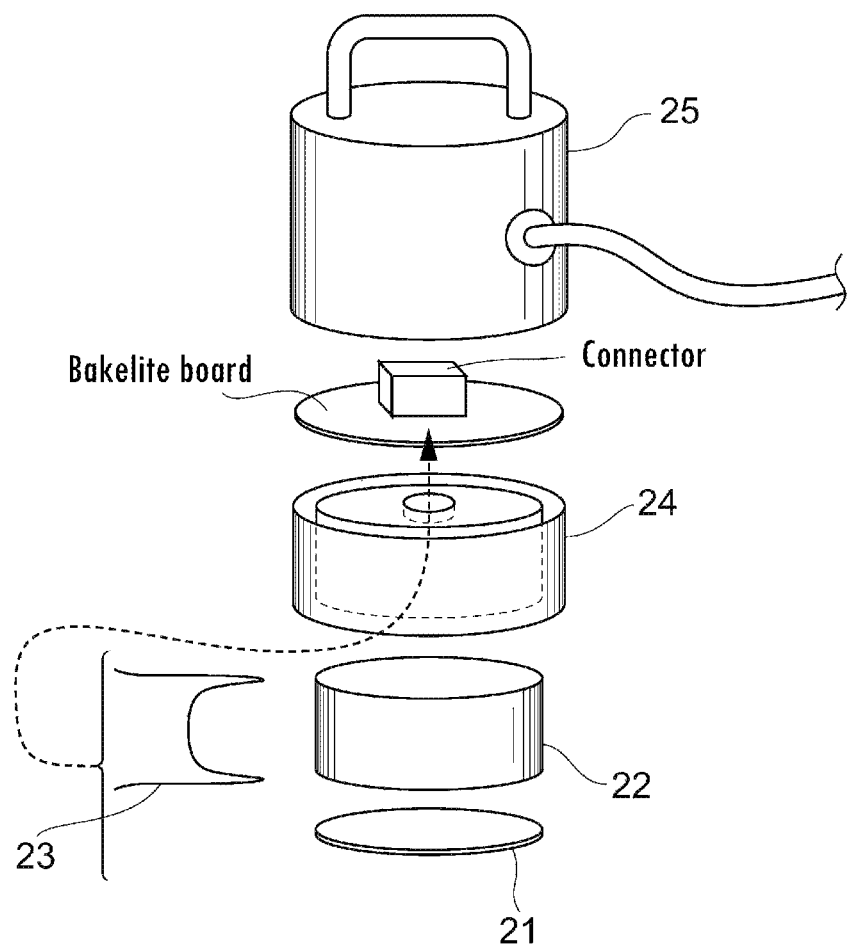
FIG. 2 is a view showing the configuration of the measuring section of a thermal conductivity measuring device according to one embodiment of the present invention.
Figure 2:
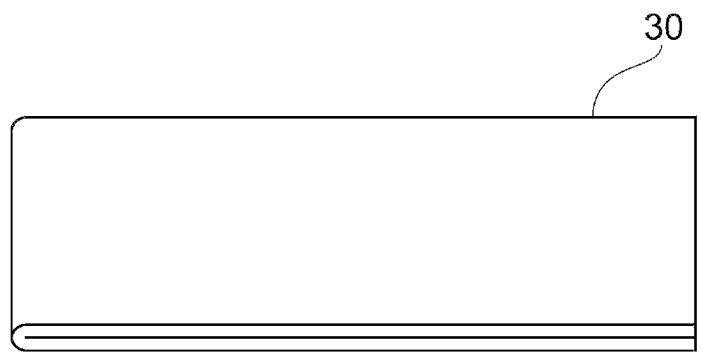

FIG. 2 is an exploded view showing the configuration of the measuring section 11. As shown in FIG. 2, the measuring section 11 comprises a heater (heat generator) 21, a heat resistant material 22, a differential thermocouple 23, a cover 24 and a weight 25.

The heater 21 is disposed in such a way as to come into contact with the heat resistant material 22 and the object to be measured 30 such as a vacuum insulation material. The heater 21 may have a double structure comprising a main heat generating section which generates a flow of heat to be measured at the center and a secondary heat generating section at its periphery for preventing a heat bridge in the traverse direction. As the heater 21, a material with little change in temperature (e.g., constantan) is used. The heater 21 may be a thin film with a pattern of a heater formed with etching after pasting a coverlay and a constantan sheet. A main heater at the main heat generating section may have 28 mm in outer diameter, about 45Ω in internal resistance and 100 mA in supply current, for example. A guard heater at the secondary heat generating section may be arranged in a doughnut shape at the outer periphery of the main heater and have 6 mm in width, about 45Ω in internal resistance and 100 mA in supply current, for example.

The heat resistant material 22 has the difference in temperature internally due to a flow of heat and may be super silica, for example. Super silica is an inorganic material, hardly causes changes in material by temperature and has the thermal conductivity of 0.0438 W/mK (when dry).

The differential thermocouple 23 measures the difference in temperature of two points inside the heat resistant material 22, wherein the temperature is generated by heat flowing from the heater 21, and outputs a voltage value caused by the difference in temperature.

Figure 3:
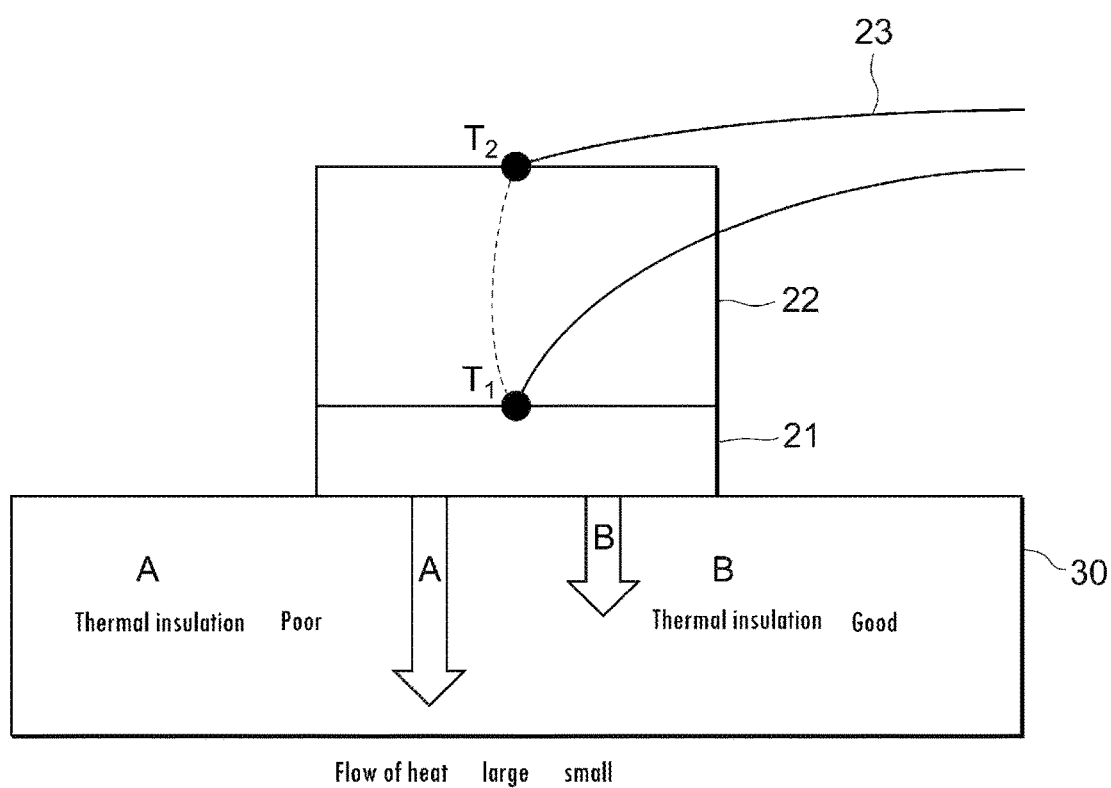
FIG. 3 is a view explaining the measurement principle of a thermal conductivity measuring device according to one embodiment of the present invention.
Figure 4:
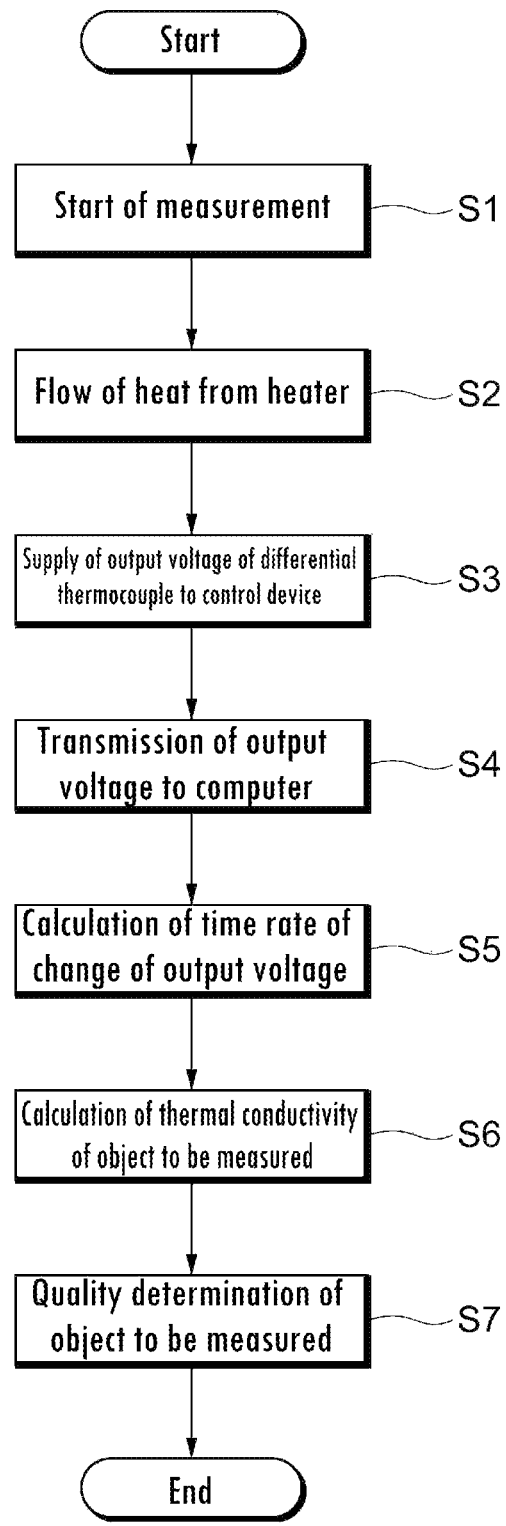
FIG. 4 is a flow diagram showing the operation of a thermal conductivity measuring device according to one embodiment of the present invention.

The differential thermocouple 23 is provided such that the difference in temperature can be measured in between at least one pair of two points inside the heat resistant material 2. It is desirable that the two points at which the difference in temperature is measured be arranged along the direction of heat flowing from the heater 21, so that the difference in temperature can easily occur between the two points. By way of example, as shown in FIG. 3, one point T1 (hot junction) may be provided at the surface in contact with the heater 21 and the other point T2 (cold junction) may be provided at a position away from the point T1 in the direction of the flow of heat (in the vertical direction in FIG. 3) (e.g., at a position 20 mm away from T1). As the differential thermocouple 23, a copper-constantan thermocouple may be used, for example. The wire diameter and resistance value may respectively be 0.1 mm and 15Ω, for example.

A plurality of the differential thermocouple 23 may be provided, so that the difference in temperature can be measured between two pairs or more of two points inside the heat resistant material 2. By way of example, three to four sets of combinations as shown in FIG. 3 (T1, T2) may be provided evenly inside the heat resistant material 2, i.e., a plurality of differential thermocouples may be provided, so that the difference in temperature can be measured at each set of two points. The differential thermocouples are connected to each other in a series, and outputs of the plurality of differential thermocouples connected to each other in a series are supplied to the control device 13. Thus, by measuring the difference in temperature of a plurality of sets using a plurality of differential thermocouples to obtain outputs of the plurality of differential thermocouples connected to each other in a series, larger output voltages can be obtained, so that the influence of noises caused by the amplification process at the control device 13 and the like can be minimized.

The cover 24 covers the heater 21 and the heat resistant material 22 to prevent the surface of the heat resistant material 22 from deteriorating and being influenced by atmospheric temperature. Materials having conductivity that is not too small are suitable for the cover 24, and therefore the cover may be made of Teflon® or acryl. As shown in FIG. 2, the cover 24 has a shape similar to that of the heat resistant material 22 and is one size larger than the heat resistant material 22; its thickness may be 5 mm, for example.

The weight 25 is disposed on the heat resistant material 22 and is capable of making the heat resistant material 22, the heater 21 and the object to be measured 30 closely adhere to each other by gravity. The weight 25 may be made of brass, for example.

The display device 12 displays information about the progress of thermal conductivity measurement, the state of the measuring section 11 and measurement results using characters and images. The display device 12 displays such information on the basis of directions given by the control device 13.

The control device 13 controls the display of the display device 12, also controls the current of the heater 21 at the measuring section 11 and transmits outputs of the differential thermocouple 23 to the computer 14. As shown in FIG. 2, the control device 13 comprises an amplifier (AMP) 131, an A/D converter 132, a constant-current circuit 133, a CPU 134, a USB interface 135, and an RS-232C interface 136. The output voltage of the differential thermocouple 23 is amplified by the amplifier 131, converted to digital signals and then supplied to the CPU 134. The results of outputs converted to digital signals are transmitted to the computer 14 via the USB interface 135 or the RS-232C interface 136. Furthermore, the control device 13 supplies a constant current (e.g., 100 mA) to the heater 21 from the constant-current circuit 133.

The computer 14 calculates the thermal conductivity of the object to be measured 30 using the measurement results received from the control device 13 at the measuring section 11. Also, the computer 14 manages other pieces of information received from the control device 13. The computer 14 comprises a main body device, a display, and input means such as a mouse and a keyboard. The procedure of calculating thermal conductivity at the computer 14 will be described below in more detail.

Next, the following describes the method for measuring thermal conductivity using the thermal conductivity measuring device 10.

First, the object to be measured 30 is placed in such a way as to come into contact with the heater 21 at the measuring section 11, and then parameters required for measurement is input into the control device 13 via the computer 14. Parameters include current values to be supplied to the heater 21 and constants required for calculating thermal conductivity, for example. After this preparation, measurement is started (S1).

After starting measurement, constant current is supplied to the heater 21 from the constant-current circuit 133, and heat generated at the heater 21 is allowed to flow through the object to be measured 30 and the heat resistant material 22 (S2).

When heat is allowed to flow through the heat resistant material 22, a voltage value caused by the difference in temperature that occurs between two points of the heat resistant material 22 is measured, and the voltage value thus measured is supplied to the control device 13 (S3).

FIG. 3 is a view showing the measurement principle of the thermal conductivity measuring device 10. As shown in FIG. 3, when the thermal insulation of the object to be measured 30 is poor (i.e., thermal conductivity is high), the flow of heat toward the object to be measured 30 side increases, so that the flow of heat toward the heat resistant material 22 decreases. Accordingly, the difference in temperature inside the heat resistant material 22 is small, and therefore the output voltage of the differential thermocouple 23 is also small. On the other hand, when the thermal insulation of the object to be measured 30 is good (i.e., thermal conductivity is low), the flow of heat toward the heat resistant material 22 increases, and therefore the output voltage of the differential thermocouple 23 is also large. On the basis of this principle, the thermal conductivity of the object to be measured 30 can be measured indirectly using the difference in temperature that occurs inside the heat resistant material 22.

At the control device 13, a voltage value supplied from the measuring section 11 is amplified at the amplifier 131, converted into a digital signal at the A/D converter 132 and then supplied to the CPU 134. Furthermore, the control device 13 transmits the voltage value that has been converted into the digital signal to the computer 14 (S4). The computer 14 starts measuring measurement time, at the same time that the differential thermocouple 23 starts measuring thermal conductivity, and transmits directions to stop measurement to the control device 13 after the lapse of a predetermined period (e.g., 30 seconds). The voltage value output from the differential thermocouple 23 is provided to the computer 14 in real time while measurement continues.

The computer 14 calculates the time rate of change (first derivation, dV/dt) of the output voltage of the differential thermocouple 23, which was obtained from the control device 13 (S5).

Furthermore, the computer 14 calculates the thermal conductivity of the object to be measured 30 on the basis of the time rate of change thus calculated (S6). Conventionally, the measurement time of two minutes or so is required, because measurement is made by supplying current to the heater until the difference in temperature reaches the steady state in order to measure accurate thermal conductivity. On the other hand, in the present embodiment, the output voltage of the differential thermocouple 23 is differentiated by time in real time to calculate the time rate of change, and the thermal conductivity of the object to be measured 30 is calculated on the basis of the time rate of change thus calculated; therefore the measurement time can be reduced to half or less compared with conventional methods, i.e., thermal conductivity can be measured accurately in a short period of time.

Figures 5, 6:
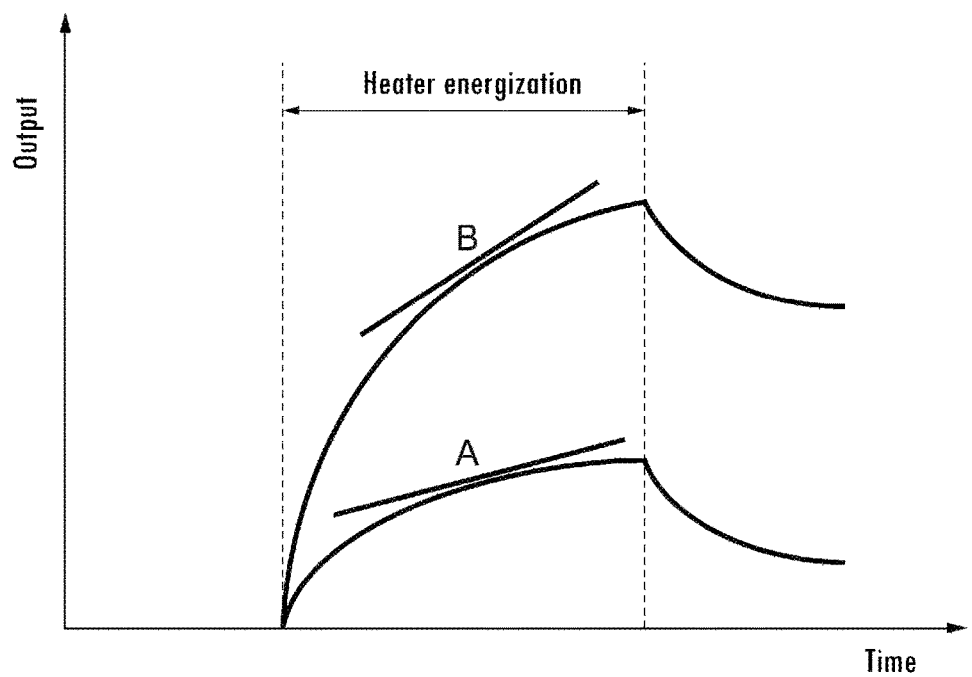
FIG. 5 is a graph showing changes in time of the output voltage of a thermocouple according to one embodiment of the present invention.
FIG. 6 is a table showing the thermal conductivity of various materials and the time rates of change of output of a differential thermocouple for the same according to one embodiment of the present invention.

FIG. 5 is a graph showing the time rate of change of the output voltage of the differential thermocouple 23. In the drawing, a curve shown by A indicates the result of measurement using the object to be measured 30 having poor thermal insulation (high thermal conductivity), and a curve shown by B indicates the result of measurement using the object to be measured 30 having good thermal insulation (low thermal conductivity). The computer 14 calculates the time rate of change (inclination) of the output voltage of the differential thermocouple 23. The relationship between the thermal conductivity (X) of the differential thermocouple 23 and the inclination of the output voltage can be represented by the following equation (1).

$$Y=aX^{-b} \quad (1)$$

(a and b are constants)

Constants a and b can be found in advance by applying the result of making measurements using two or more kinds of samples to the equation (1). It is desirable that the thermal conductivity of samples used for calculating constants a and b be approximately close to the thermal conductivity of the object to be measured 30.

Figure 7:
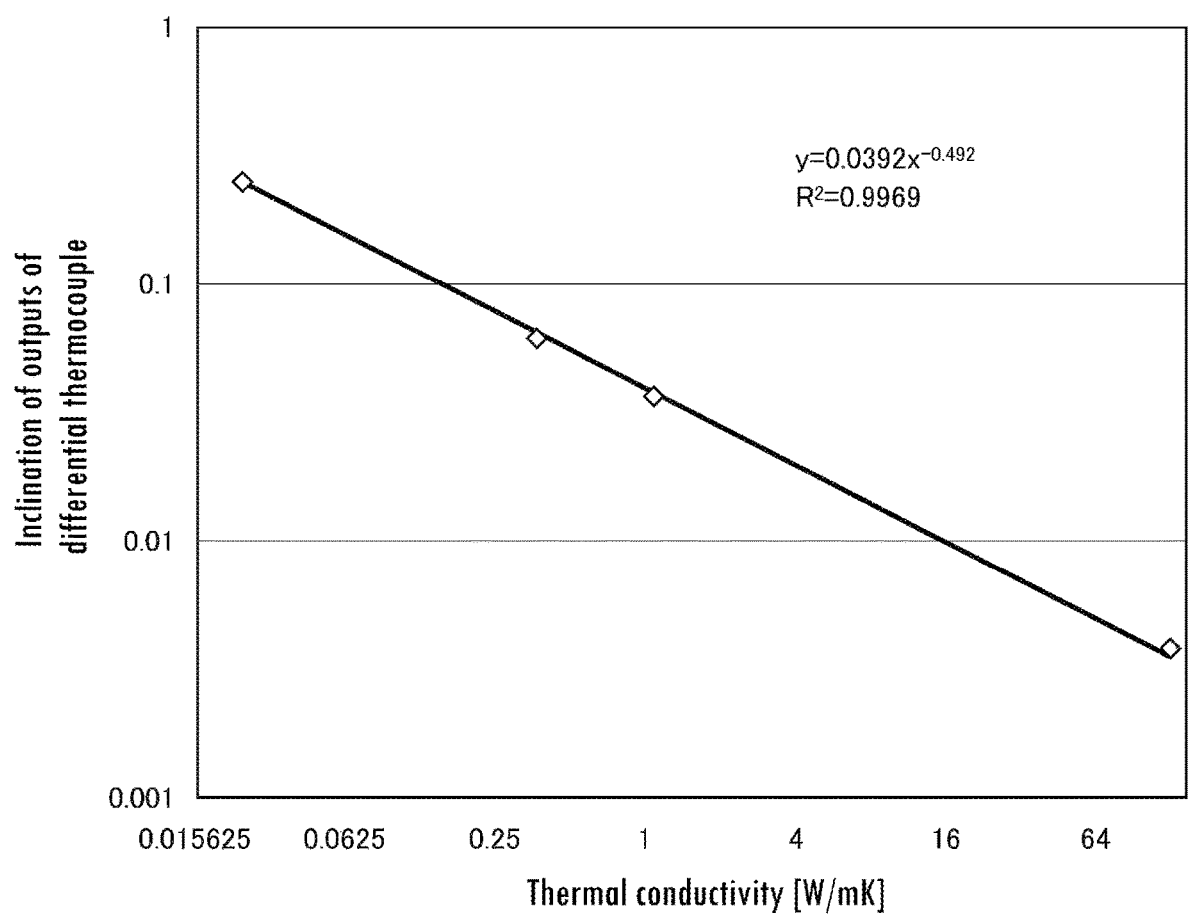
FIG. 7 is a graph showing the relationship between the thermal conductivity of various materials and the time rates of change of output of a differential thermocouple for the same according to one embodiment of the present invention.

FIG. 6 is a table showing the thermal conductivity of samples and the inclination of outputs of a differential thermocouple of the same, and FIG. 7 is a graph showing the results in FIG. 6. The horizontal axis and the vertical axis show thermal conductivity and the inclination of outputs of a differential thermocouple, respectively. As shown in FIG. 7, the plotting of results of those samples substantially makes a straight line. More specifically, as shown in FIG. 7, it approximately satisfies the following relationship: $Y=0.0392 X^{-0.492}$. Accordingly, the thermal conductivity of the object to be measured 30 can be calculated by finding the equation of this calibration curve in advance and then applying the measurement result (i.e., the inclination of outputs of a differential thermocouple) of the object to be measured 30 thereto.

The computer 14 performs the quality determination of the object to be measured 30 on the basis of the thermal conductivity of the object to be measured 30 thus calculated (S7). By way of example, acceptance or rejection may be judged by finding whether or not the values of calculated thermal conductivity fall within a predetermined range. The determination result may be displayed on the display of the computer 14 or the display device 12.

Thus, according to the present embodiment, the computer 14 calculates the time rate of change of the output voltage of the differential thermocouple 23, which is obtained from the control device 13, and then calculates the thermal conductivity of the object to be measured 30 on the basis of the time rate of change thus calculated; therefore it is not required to wait for the time when the difference in temperature measured reaches the steady state, i.e., thermal conductivity can be measured accurately in a short period of time.

Moreover, the difference in temperature is measured at a plurality of places using a plurality of differential thermocouples, and thermal conductivity is calculated using outputs of the plurality of differential thermocouples connected to each other in a series; therefore the influence of noises caused by the amplification process at the control device 13 and the like can be minimized.

In the present embodiment, the time rate of change of the output voltage of the differential thermocouple 23, which is obtained by the computer 14 from the control device 13, is calculated, and the thermal conductivity of the object to be measured 30 is calculated on the basis of the time rate of change thus calculated; however, the time rate of change of the output voltage of the differential thermocouple 23 may instead be calculated using software mounted on the control device 13.

Furthermore, when the surface of the object to be measured 30 is uneven, the heater 21 cannot closely be adhered to the object to be measured 30; therefore there is some possibility that thermal conductivity cannot accurately be measured. Hence, on the surface where the heater 21 comes into contact with the object to be measured 30, a buffer material may be provided for absorbing the uneven shape of the object to be measured 30. More specifically, if a sheet of about 0.3-0.6 mm in thickness made of silicone may be pasted to the surface of the heater 21, the uneven shape on the surface of the object to be measured 30 is absorbed into the sheet, so that thermal conductivity can be measured more accurately.

Figure 8:
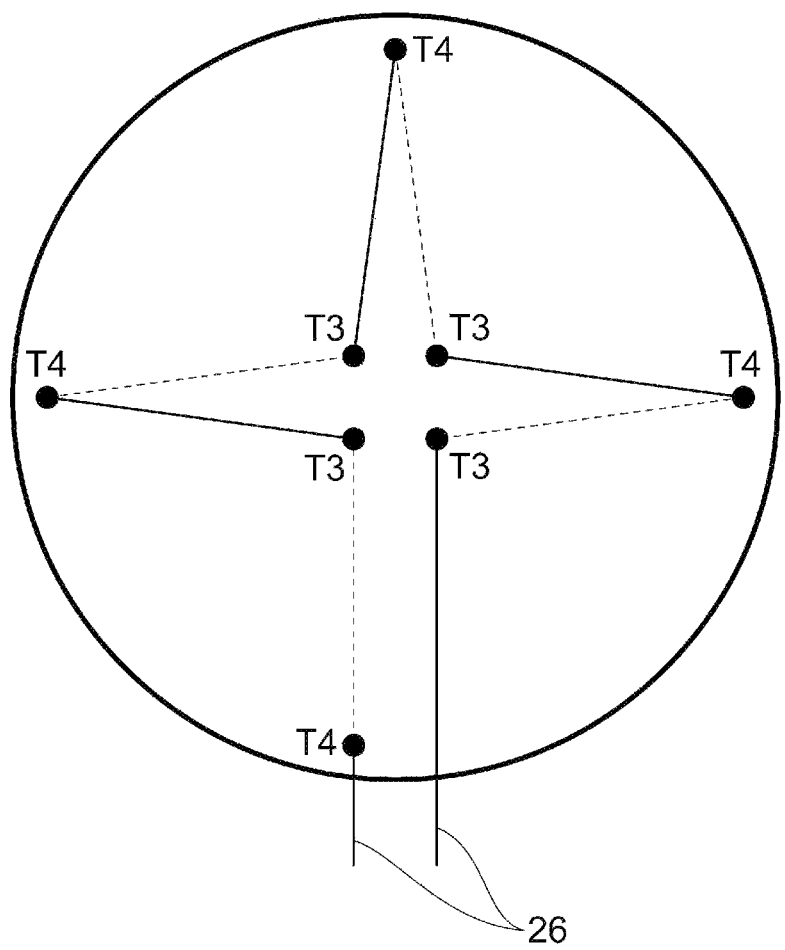
FIG. 8 is a view showing one example of differential thermoelectric piles used for measuring the difference in temperature between the central section and the peripheral section according to one embodiment of the present invention.

In the case of a vacuum insulation material used as a housing construction material, the vacuum insulation material might be covered with a foaming material for the purpose of protection or the like. In such a case, there is some possibility that the flow of heat from the heater 21 occurs in the traverse direction due to the influence of the foaming material, so that the difference in temperature cannot accurately be made along the direction of the flow of heat (i.e., a direction toward T2 from T1 in FIG. 3). Therefore, the heater 21 may be provided with a mechanism of overseeing the flow of heat in the traverse direction in order to compensate therefor. More specifically, measurement may be made using a differential thermoelectric pile 26 for measuring the difference in temperature between the center section and the peripheral section as shown in FIG. 8. FIG. 8 shows the surface where the heat resistant material 22 comes into contact with the heater 21. The differential thermoelectric pile 26 measures the difference in temperature between a point at the center section of the heat resistant material 22 and a point at the peripheral section of the same and outputs a voltage on the basis of the difference in temperature. As shown in FIG. 8, a plurality of points T3 at the center section and a plurality of points T4 at the peripheral section are provided, i.e., eight pairs of differential thermocouples are connected to each other in a series, wherein each pair measures the difference in temperature between T3 and T4. The computer 14 and the control device 13 compensate for the flow of heat in the traverse direction between the center section and the peripheral section using the eight pairs of differential thermocouples connected to each other in a series to correct the thermal conductivity of the object to be measured 30.

(Vacuum evaluation device) The thermal conductivity measuring device according to the present invention may also be used as a vacuum evaluation device for evaluating the degree of vacuum of the object to be measured 30 using thermal conductivity when the object to be measured 30 is a vacuum insulation material or the like. In this case, the computer 14 stores parameters (e.g., thermal conductivity that is a threshold value to judge acceptance or rejection) for evaluating the degree of vacuum of a vacuum insulation material to be measured. By way of example, the computer 14 makes a comparison between the calculated thermal conductivity of the object to be measured 30 and the thermal conductivity that is the threshold value and judges acceptance if the measured value is equal to or below the threshold value and judges rejection if the measured value is higher than the threshold value.

Thus, the degree of vacuum can be evaluated with high efficiency in a short period of time by evaluating the degree of vacuum of the object to be measured 30 using measured thermal conductivity.

EXPLANATION OF REFERENCE NUMERALS

10: Thermal conductivity measuring device, 11: measuring section, 12: display device, 13: control device, 14: computer, 21: heater, 22: heat resistant material, 23: differential thermocouple, 24: cover, 25: weight, 26: differential thermoelectric pile, 30: object to be measured, 131: amplifier (AMP), 132: A/D converter, 133: constant-current circuit, 134: CPU, 135: USB interface, 136: RS-232C interface.

What is claimed is:

1. A thermal conductivity measuring device, comprising:
a heat generator arranged in such a way as to come into contact with an object to be measured for thermal conductivity;
a heat resistant material arranged in such a way as to come into contact with the heat generator;
at least one pair of differential thermocouples for measuring a voltage value caused by a difference in temperature of two points of the heat resistant material, the temperature being generated by allowing heat to flow from the heat generator; and
a calculating device for calculating a time rate of change of an output voltage of the differential thermocouples and then calculating the thermal conductivity of the object to be measured on the basis of the calculated time rate of change.

2. The thermal conductivity measuring device according to claim 1, wherein the calculating device calculates the thermal conductivity of the object to be measured by making measurements before calculating the thermal conductivity of the object using two or more kinds of materials whose thermal conductivity is known and then using a linear equation found on the basis of a relationship between the thermal conductivity of each material and the time rate of change of the output voltage of the differential thermocouples at the time of making a measurement for each material.

3. The thermal conductivity measuring device according to claim 1, the device comprising two or more of the differential thermocouples, wherein each differential thermocouple measures a voltage value caused by the difference in temperature of two different points, the each differential thermocouple being connected to each other in a series, wherein the calculating device calculates the time rate of change of outputs of a plurality of differential thermocouples connected to each other in a series and then calculates the thermal conductivity of the object to be measured on the basis of the calculated time rate of change.

4. The thermal conductivity measuring device according to claim 1, wherein, on the surface where the heat generator comes into contact with the object to be measured, a buffer material for absorbing an uneven shape of the object to be measured is provided.

5. The thermal conductivity measuring device according to claim 1, the device comprising a mechanism of measuring the difference in temperature that occurs inside the heat resistant material due to the flow of heat from the heat generator in a traversal direction, wherein the calculating device corrects the thermal conductivity of the object to be measured using the difference in temperature in the traversal direction thus measured.

6. The thermal conductivity measuring device according to claim 1, wherein the calculating device calculates the thermal conductivity of the object to be measured using the equation (1) shown below:

$$Y = aX^{-b} \tag{1}$$

(wherein, in the equation (1), X is the thermal conductivity of the object to be measured, Y is the time rate of change of the output voltage of the differential thermocouples, and a and b are constants).

7. The thermal conductivity measuring device according to claim 6, wherein the constants a and b in the equation (1) are values found by applying, to the equation (1), results obtained by making measurements using two or more kinds of materials whose thermal conductivity is known.

8. A method for measuring thermal conductivity, wherein:
a control unit controls a heat generator to generate heat arranged in such a way as to come into contact with an object to be measured for thermal conductivity as well as with a heat resistant material;
a calculating device obtains a voltage value caused by a difference in temperature of two points of the heat resistant material, which is measured by a differential thermocouple;
the calculating device calculates a time rate of change of an output voltage of the differential thermocouple; and
the calculating device calculates the thermal conductivity of the object to be measured on the basis of the time rate of change thus calculated.

9. The method for measuring thermal conductivity according to claim 8, wherein the calculating device calculates the thermal conductivity of the object to be measured by making measurements before the calculating device calculates the thermal conductivity of the object using two or more kinds of materials whose thermal conductivity is known and then using a linear equation found on the basis of a relationship between the thermal conductivity of each material and the time rate of change of the output voltage of the differential thermocouple at the time of making a measurement for each material.

10. The method for measuring thermal conductivity according to claim 8, wherein the calculating device calculates the thermal conductivity of the object to be measured using the equation (1) shown below:

$$Y = aX^{-b} \tag{1}$$

(wherein, in the equation (1), X is the thermal conductivity of the object to be measured, Y is the time rate of change of the output voltage of the differential thermocouple, and a and b are constants).

11. The method for measuring thermal conductivity according to claim 10, wherein the constants a and b in the equation (1) are values found by applying, to the equation (1), results obtained by making measurements using two or more kinds of materials whose thermal conductivity is known.

12. A vacuum evaluation device, comprising:
a heat generator arranged in such a way as to come into contact with an object to be measured for a degree of vacuum;
a heat resistant material arranged in such a way as to come into contact with the heat generator;
at least one pair of differential thermocouples for measuring a voltage value caused by a difference in temperature of two points of the heat resistant material, the temperature being generated by allowing heat to flow from the heat generator;

a calculating device for calculating a time rate of change of an output voltage of the differential thermocouples and then calculating the thermal conductivity of the object to be measured on the basis of the calculated time rate of change; and a vacuum evaluation section for evaluating the degree of vacuum of the object to be measured on the basis of the thermal conductivity thus calculated.

\* \* \* \* \*